United States Patent [19]

Johnson

[11] 4,420,119
[45] Dec. 13, 1983

[54] HORIZONTAL SILAGE UNLOADER

[76] Inventor: Vernon V. Johnson, P.O. Box 65, Glava, Iowa 51020

[21] Appl. No.: 308,239

[22] Filed: Oct. 2, 1981

[51] Int. Cl.³ .......................................... B02C 13/286
[52] U.S. Cl. ............................. 241/101.7; 241/101 A; 241/101.4; 241/186 R
[58] Field of Search ............ 241/101.7, 101 A, 186 A, 241/186.2, 189 R, 101.4, 186 R; 100/65; 141/114

[56] References Cited

U.S. PATENT DOCUMENTS

| | | | |
|---|---|---|---|
| 1,532,022 | 7/1924 | Bamford et al. | |
| 1,749,785 | 4/1927 | Smith | |
| 2,498,833 | 2/1950 | Weyer | 241/101.7 X |
| 3,021,180 | 4/1960 | Crump | |
| 3,363,785 | 12/1965 | Kucera | |
| 3,452,715 | 10/1966 | Flittie | |
| 3,687,061 | 8/1972 | Eggenmuller et al. | 100/65 |
| 3,926,378 | 12/1975 | Ryan | 241/101 A X |
| 3,985,305 | 10/1976 | Williamson et al. | 241/101.7 |
| 3,991,718 | 11/1976 | Stinnes | |
| 4,068,804 | 1/1978 | Butler et al. | 241/101.7 |
| 4,243,346 | 1/1981 | Wolf | |
| 4,367,855 | 1/1983 | Von Der Heide | 241/101.7 X |

FOREIGN PATENT DOCUMENTS

| | | |
|---|---|---|
| 1124427 | 4/1960 | Fed. Rep. of Germany |
| 1201598 | 9/1965 | Fed. Rep. of Germany |
| 1915209 | 10/1970 | Fed. Rep. of Germany |
| 2204832 | 8/1973 | Fed. Rep. of Germany |
| 6704698 | 10/1967 | Netherlands |

*Primary Examiner*—Mark Rosenbaum
*Attorney, Agent, or Firm*—Henderson & Sturm

[57] ABSTRACT

This invention pertains to horizontal silage bag unloaders in general, and more specifically to an unloading mechanism which surrounds the open end of the bag, discharges the contents of the bag, slits the sides of the bag and rolls the bag up as it travels along the bags length towards a stationary backstops member disposed against the closed end of the bag.

7 Claims, 6 Drawing Figures

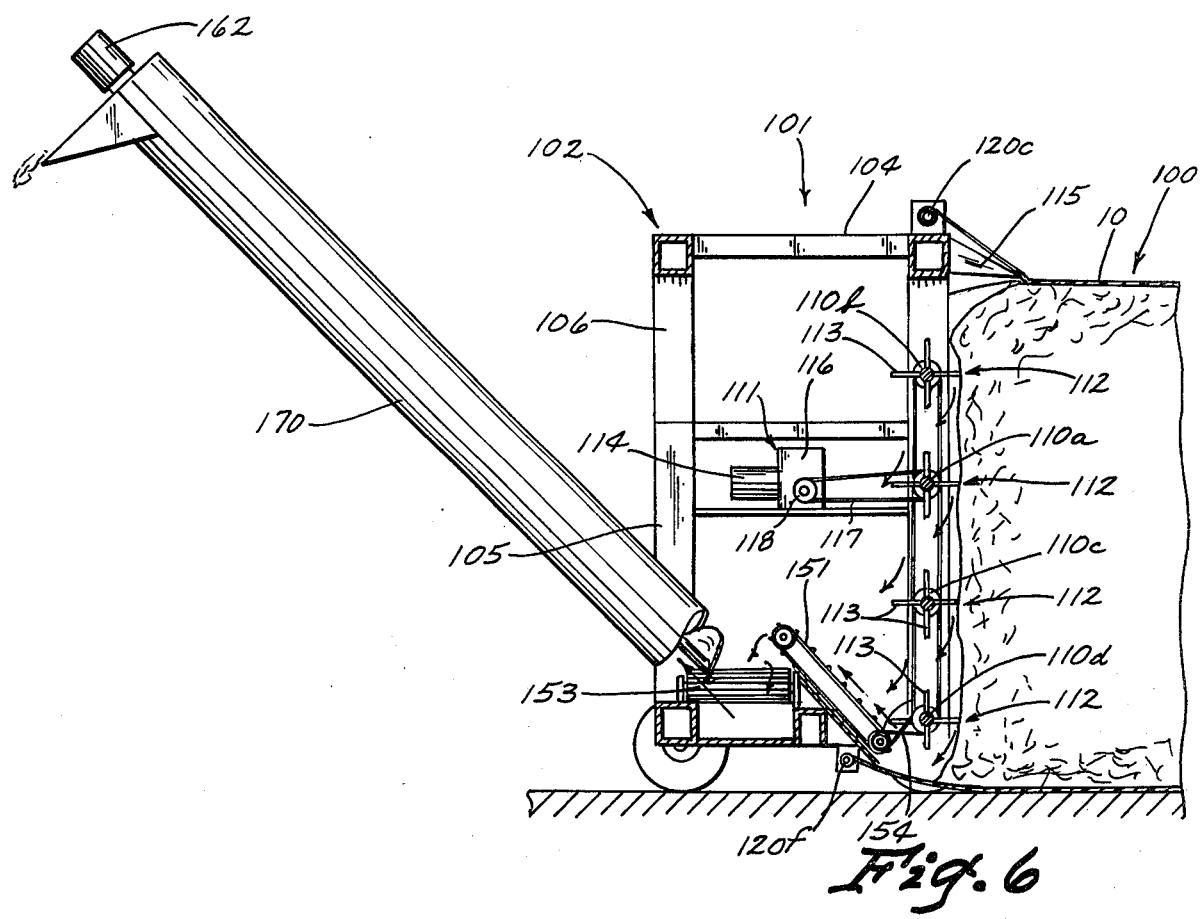

HORIZONTAL SILAGE UNLOADER

BACKGROUND OF THE INVENTION

Due to the high cost of erecting and maintaining permanent silas for the storage and fermentation of grains, cereals etc., alternate silage storage methods have been devised.

One of the newest, least expensive and most practical alternatives to a permanent silo structure, involves the use of an elongated tubular plastic bag, into which silage is fed and stored for fermentation. These bags are normally over 100 feet in length, and are intended to be filled in the fields, and left on the ground while the silage ferments.

While this system does not require permanent structures to be erected for storage, and prevents field losses, with resultant increases in available feed and nutrition per acre, it does present some inherent problems associated with its employment.

The major obstacle presented by this system is how to remove the silage from the bag to feed the livestock, in a quick, efficient, practical manner. At the present time most farmers simply open one end of the bag, and use a front end loader to remove the contents; or they place a grate over the open end, and allow the livestock to feed directly from the bag.

With respect to patented devices directed to a solution of this problem, the most pertinant appears to be U.S. Pat. No. 4,243,346 and German Pat. No. 2,225,783. The U.S. patent shows an unloading implement for horizontal silos which is driven by a power take-off from a tractor, having vertical fingered tools which move, both up and down, and towards and away from, the body of the silage; to engage it and pass it downwardly to a conveyor. The German patent shows what appears to be a silage unloader having rotary cutters, which are moveable vertically to cut the silage up. In addition the German patent is referred to and described to some extent in U.S. Pat. No. 2,225,783, but is not considered as pertinent as the U.S. patent.

While these prior art devices are adequate for their intended purpose, they are still dificient in many respects. The most glaring deficiency being that they do not provide for disposal of the horizontal silo either concurrantly with, or subsequent to, unloading of its contents. Furthermore, the flailing action of the unloading mechanism they disclose, will tend to shred the plastic material, which will be mixed in with the silage, and ingested by the livestock, with dire consequences for both the animals and the owner. Other defects apparent in these devices are that the unloading mechanisms are not particularly efficient and cannot extract the entire contents of the silage bags except under the most ideal of conditions. They also do not have any provisions to immobilize the bags during unloading, nor do they provide any positive means to force the contents of the bag, in a direction relative to the unloading means, to promote discharge of the contents.

To date no one has devised a horizontal silage unloading device, which has successfully addressed all of the aforementioned problems and deficiencies, until the conception of the device which forms the basis of this invention.

SUMMARY OF THE INVENTION

An object of the present invention is the provision of a horizontal silage unloader which will provide a positive discharge from the open end of a horizontal silage bag.

Another object of the present invention is the provision of a horizontal silage unloader which will load the discharged portion of the silage bag onto the unloader as it discharges silage from the remaining portion of the bag.

A further object of the present invention is the provision of a horizontal silage unloader which slits the silage bag as it travels along its length discharging its contents.

Still another object of the present invention is the provision of a silage unloader, which is provided with a guide means, to direct the unloading mechanism along the length of the silage bag and towards a stationary element, which exerts a pushing force on the contents of the bag, relative to the direction of travel of the unloading mechanism.

A still further object of the present invention is the provision of a horizontal silage unloader which employs rotary beaters to discharge the contents of the silage bag onto a conveyor system for unloading onto a wagon for transport from the bag site.

Yet another object of the present invention is the provision of a horizontal silage unloader which accomplishes all of the objectives enumerated supra, while overcoming all of the inherent problems and deficiencies of the prior art devices, and further accomplishes these ends by means of a simple, easy to operate, efficient mechanism, which is a vast improvement over any other device currently available.

These and other objects, advantages and novel features of the invention will become apparent from the detailed description which follows, when considered in light of the accompanying drawings.

BRIEF DESCRIPTION OF THE DRAWINGS

FIG. 6 is a cross-sectional elevational view taken along line 6—6 of FIG. 4.

DETAILED DESCRIPTION OF THE PREFERRED EMBODIMENT

Figure 1:
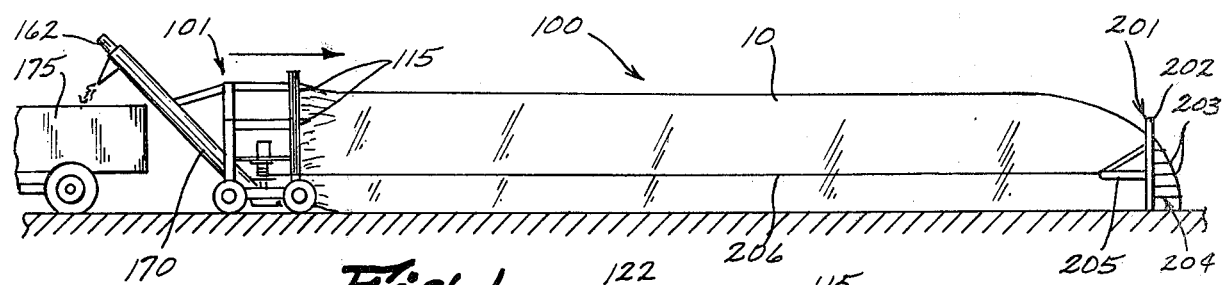
FIG. 1 is an elevational view of the present invention in operation unloading a horizontal silage bag.
Figure 2:
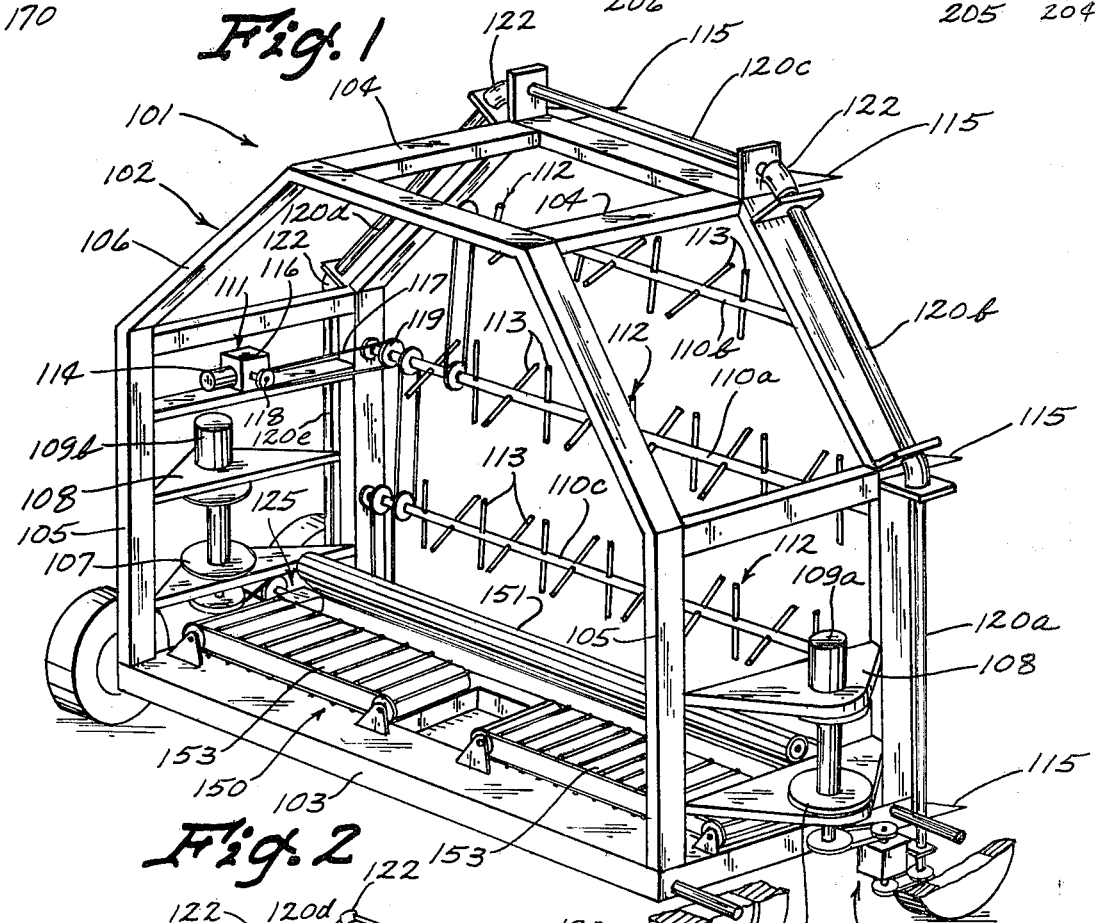
FIG. 2 is a perspective view of the unloading mechanism of the present invention.

As can be seen by reference to FIGS. 1 and 2, the horizontal silage unloader is designated generally as 100, and comprises an unloading mechanism 101 disposed on one end of a horizontal silage bag 10, and a backstop member 201 disposed on the other end of the silage bag.

Figure 4:
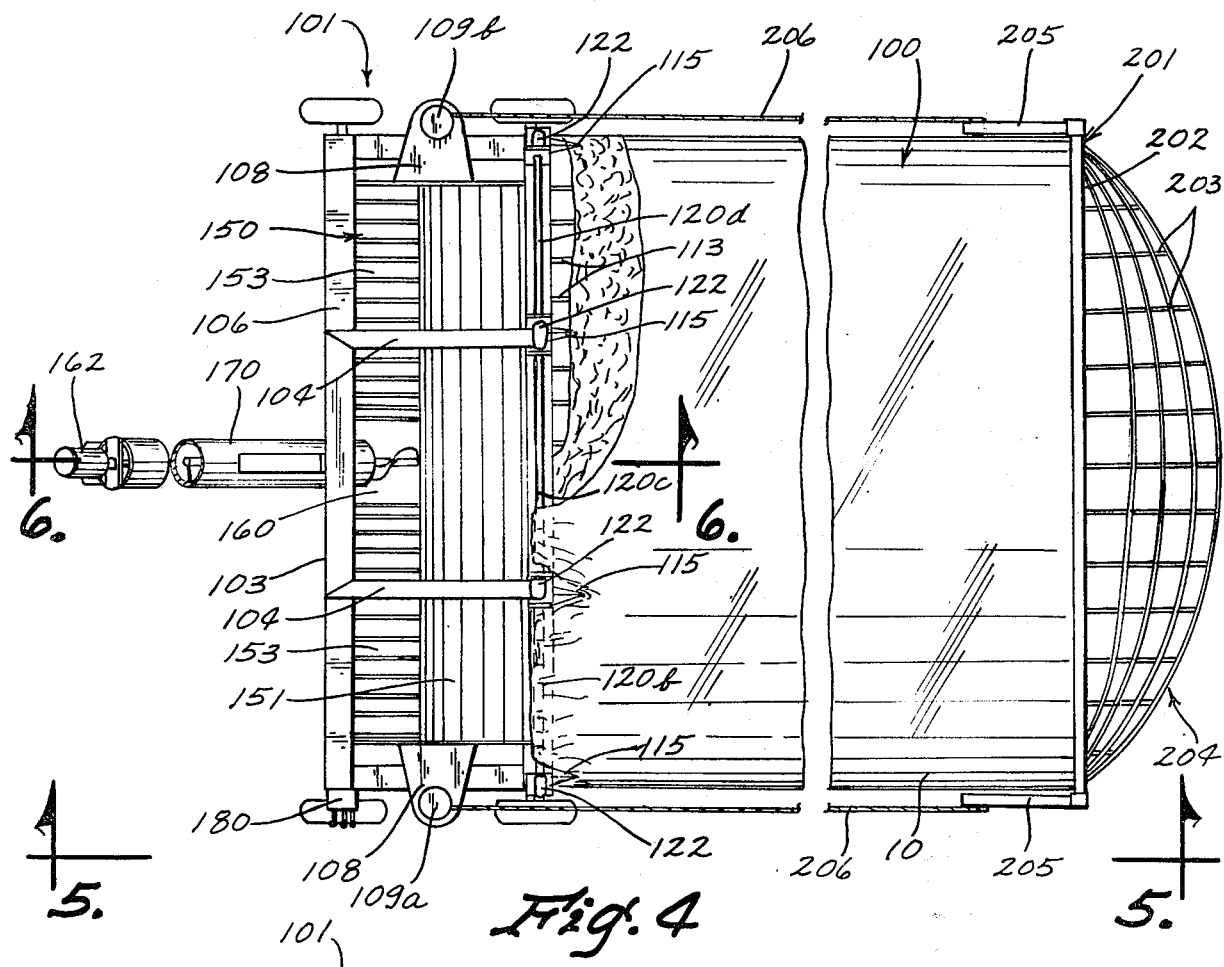
FIG. 4 is a plan view of the present invention installed on a horizontal silage bag.
Figure 5:
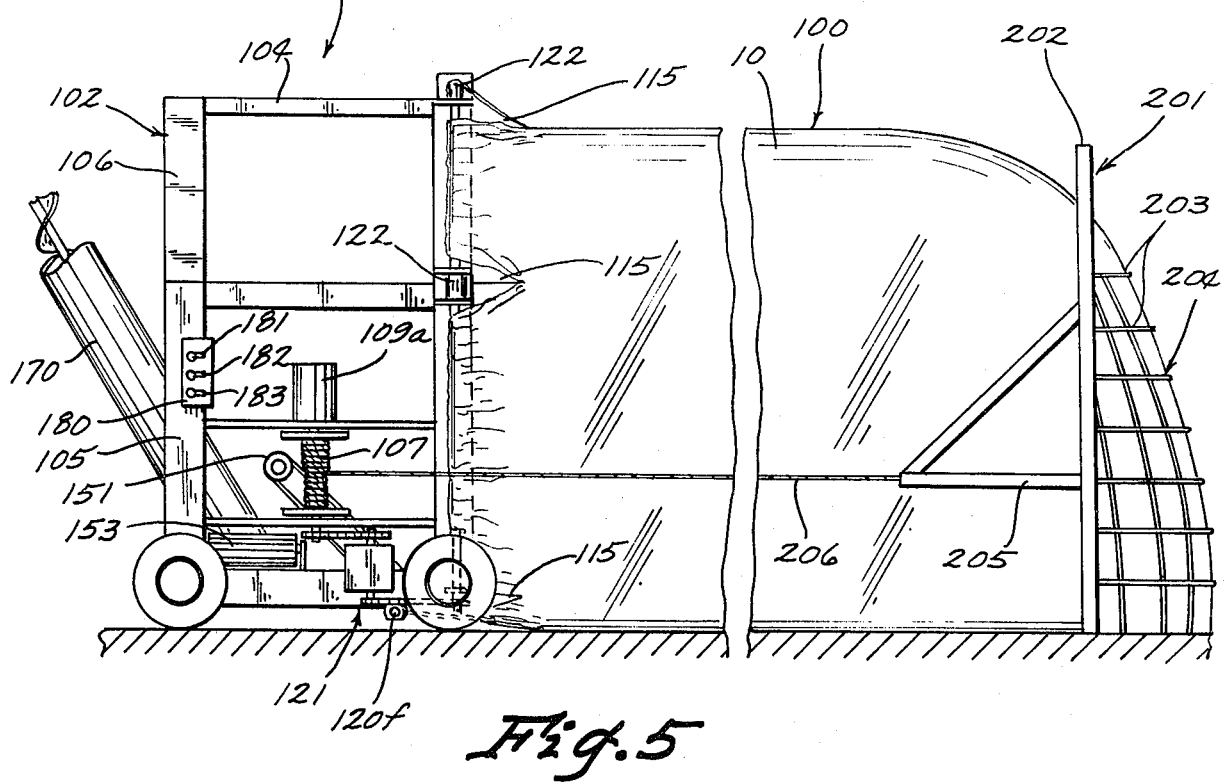
FIG. 5 is an elevational view taken along line 5—5 of FIG. 4.

With reference to FIGS. 4 and 5, backstop member 201 comprises a generally D-shaped tubular framework 202 which supports a plurality of strands 203 formed into a gridwork 204. Projecting from the sides of the framework 202 are a pair of parallel cables support members 205, which face the direction of the unloading mechanism 101. A pair of cables 206 operatively connected to the backstop member 201 to the unloading mechanism 101 in a manner which will be discussed further on in the specification.

The unloading mechanism 101 comprises a wheeled framework 102 having a bed 103, an open rectangular top 104, vertical supports 105 and angled supports 106. Disposed on either side and projecting from the framework 102 are a pair of hydraulic cable winches 107. The cable winches 107 are supported by a pair of tapered parallel arms 108, which are supported by vertical supports 105. The cable winches 107 are powered by hydraulic motors 109a and 109b.

Figure 3:
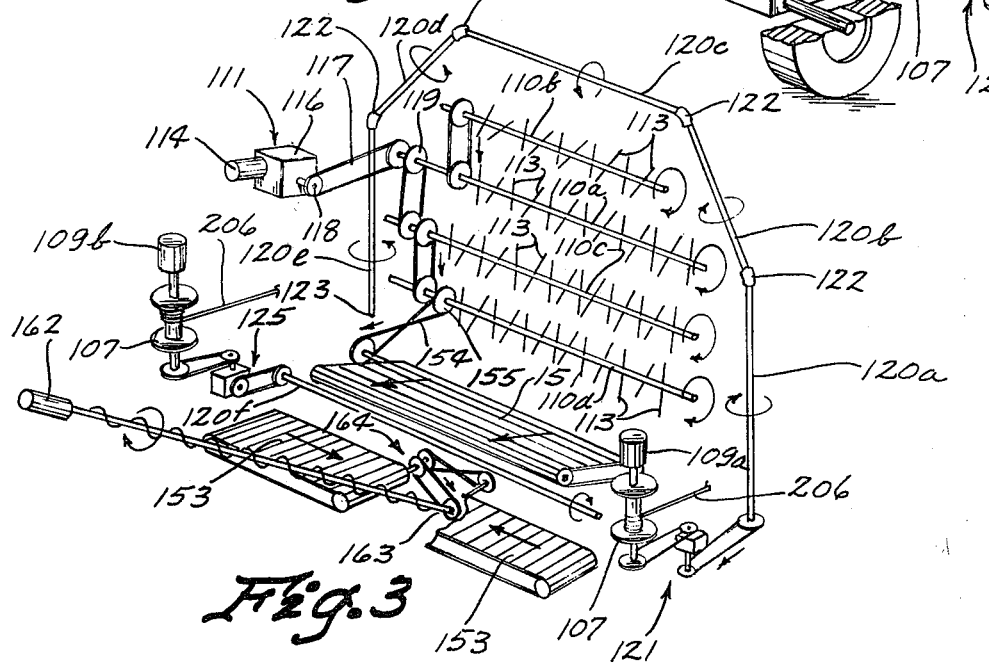
FIG. 3 is a partially schematic perspective view of the driving mechanisms of the present invention.

A plurality of parallel beater shafts 110a–110d are rotatably disposed in the rear legs of the framework 102 and operatively connected to a beater drive mechanism 111, which causes the shafts 110a–110d to rotate in unison as best shown in FIG. 3. Each of the beater shafts 110a–110d are provided with a plurality of spaced beater elements 112 which are comprised of a plurality of beater rods 113 which engage, break-up and discharge the compacted silage as the unloading mechanism 101 advances towards the backstop member 201. Note that beater elements 112 could be of any of many different designs suitable to engage and discharge the compacted silage.

Beater drive mechanism 111 includes a hydraulic motor 114 whose output is connected through a 50 to 1 gear box 116 to beater rod 110a via an endless chain, or belt, 117 and suitable sprockets, or pulleys, 118, 119. Beater rod 110a is in turn connected by suitable endless chains, or belts, and sprockets, or pulleys, to beater rods 110b and 110c. Beater rods 110c in turn powers beater rod 110d via a suitable power transmission belt or chain, and cooperating pulleys or sprockets as shown in FIGS. 2 and 3. All of the beater rods 110a–110d, hence, rotate in unison to engage and discharge the silage. While beater rods 110a–110d are disclosed as vertically arranged they could alternatively be inclined angularly into the bag 10.

A plurality of cutter blades 115 are disposed on the corners of the rearward face of the unloading melchanism 101, and these cutter blades cooperate with a plurality of plastic gathering rollers 120a–120f. Rollers 120a–120e are rotatably supported, but spaced from, the periphery of the framework 102 proximate the rearward face thereof. Roller 120f is supported on the bottom of frame 102.

Gathering rollers 120a–120e are operatively connected to a roller drive mechanism 121, which rotates the rollers in unison horizontal gathering conveyors 153 are mounted on the forward portion of the unloader framework, and rotate towards one another, so that they deposit the silage into a central hopper 160 formed in the framework 102. A discharge auger 170 is disposed at the outlet of the hopper or chute 160, and the silage is moved by the auger 170, in a well known manner, to a point, such as a feed wagon 175, etc., remote from the unloading mechanism.

The various conveyor mechanisms of the conveyor arrangement 150 are powered as follows:

The diagonal platform conveyor 151 is powered via an endless chain, or belt, 154 by a suitable sprocket, or pulley, 155 which is rigidly affixed to beater rod 110d. Unloading auger 160 is powered by hydraulic motor 162, and the rotatably powered lower end 163 of auger 160 is connected by means of a suitable transmission mechanism 164 to the horizontal conveyors 153 to power the conveyors 153. See FIG. 3. Note that while conveyors 151 and 153, and auger 170 have been disclosed other conveying means could alternatively be employed.

The control mechanism for the unloading mechanism is a hydraulic control panel 180, employing a three way directional control valve (not shown) which is actuated by a plurality of levers 181, 182 and 183. Each of the levers controls a different drive mechanism; lever 181 controls the flow of hydraulic fluid to motor 161 which powers the unloading auger 160 and horizontal conveyors 153; lever 182 controls motors 109a and 109b which power the cable winch drives 107 and plastic roller accumulators 120a–120f; and lever 183 controls hydraulic motor 114 which powers the beater rods 110a–110d and diagonal conveyor 151. The actual fluid supply lines of the hydraulic system have been eliminated to clarify the drawings. However, their placement would be obvious to one skilled in the art in view of the teachings of the invention. The invention could be run off of the hydraulic system of a tractor or any other suitable hydraulic supply system. Alternatively, the motors could be nonhydraulic and of virtually any type.

The operation of the horizontal silage unloader 100 is as follows: the backstop member 201 is positioned at one end of the silage bag 10, and may be anchored or secured in place by suitable means; the unloading mechanism 101 is wheeled up to the other end of the silage bag 10; the cables 206, which extend from the backstop member 201, are attached to the cable winches 107 to connect the backstop member 201 and the unloading mechanism 101 together; the end of the silage bag 10 proximate the unloading mechanism is opened up and the sides of the bag are slit by the plastic cutters 115; the segments of slit plastic are attached to the plastic gathering rollers 120a–120f and the unloader is operational.

The control levers 181, 182 and 183 can now be engaged to rotate the beaters 110 to dislodge the silage from the bag 10 and deposit it upon the conveyor system 150 for discharge at a remote location. As the rotary beaters 110a–110d are unloading the silage from within the bag 10 the cable winches 107 are engaged to move the unloading mechanism 101 in the direction of the backstop member 201. The cable winches 107 and backstop 201 thus comprise an unloader travel mechanism. This movement of the unloading mechanism 101 produces a positive feed of the silage into the path of the rotary beaters 110a–110d and promotes discharge of the silage from the bag 10. As the unloading mechanism advances the plastic gathering rollers 120a–120f are engaged to draw the plastic bag 10 across or against the cutters 115 to split the bag 10 into sections which are accummulated by the rollers.

It should be appreciated that the above described device, is guided by the cable 206 disposed along the length of the horizontal silage bag 10, as it discharges the contents of the plastic bag 10, which is split and accummulated by the rollers 120a–120f.

The present invention as described above, thus, comprises a highly inventive improvement to the art of horizontal silage bag unloading as should now be appreciated.

Having thereby disclosed the subject matter of this invention, it should be obvious that many modifications, substitutions and variations of the preferred embodiment are possible in light of the above teachings, and therefore the invention should be limited in its interpretation only to the breadth and scope of the appended claims.

I claim:

1. A horizontal silage unloader for use with an elongated plastic bag containing silage, comprising:

an unloading mechanism which includes a wheeled framework which supports a plurality of driven rotary beater elements;

a bed associated with the wheeled framework which accomodates a plurality of driven conveyor means;

travel means associated with said unloader mechanism to move said unloader mechanism from one end of the plastic silage bag to the other end of the plastic silage bag;

a plurality of driven plastic gathering rollers rotatably supported upon said wheeled framework;

a plurality of cutter blades mounted on said wheeled framework and adapted to sever the plastic bag into sections as said wheeled framework moves from one end of the plastic silage bag to the other; and means associated with said driven plastic gathering rollers to attach the ends of said plastic sections to the gathering rollers to accumulate the cut plastic sections as the unloader mechanism moves from one end of the bag to the other.

2. A horizontal silage unloader as in claim 1, wherein said travel means comprises a backstop member having a framework with a gridwork secured to the framework, and at least one cable support arm projecting from the framework; and at least one cable operatively connected between said backstop member and said wheeled framework adopted to move said unloader mechanism relative to said backstop member and from one end of the silage bag to the other.

3. A horizontal silage unloader as in claim 2, wherein the said at least one cable is connected on one end to said cable support arm, and the other end is connected to a winch means supported by said wheeled framework.

4. A horizontal silage unloader as in claim 3, wherein the movement of the unloading mechanism relative to the backstop brings the rotary elements into engagement with the silage contained within the silage bag and produces a positive feed of the silage into the unloading mechanism.

5. A horizontal silage unloader as in claim 1, wherein the rotary beater elements comprise:

a plurality of spaced beater rods, mounted on a plurality of parallel beater shafts rotatably supported by the unloader framework.

6. A horizontal silage unloader as in claim 1, wherein the plurality of driven conveyor means comprises:

a diagonal conveyor means having one end disposed proximate the lowermost beater shaft, and the other end disposed proximate at least one elevated gathering conveyor means to deposit silage into a chute formed in the unloader mechanism framework.

7. A horizontal silage unloader as in claim 6, wherein the plurality of driven conveyor means further comprises:

a discharge conveyor means disposed at the outlet of said chute to feed silage to a location remote from the unloading mechanism.

* * * * *